(12) United States Patent
Kurtz

(10) Patent No.: US 7,921,721 B2
(45) Date of Patent: Apr. 12, 2011

(54) LEADLESS OIL FILLED PRESSURE TRANSDUCER

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 131 days.

(21) Appl. No.: 12/384,828

(22) Filed: Apr. 9, 2009

(65) Prior Publication Data

US 2010/0257937 A1    Oct. 14, 2010

(51) Int. Cl.
*G01L 7/00* (2006.01)

(52) U.S. Cl. .......................................................... 73/714

(58) Field of Classification Search .................... None
See application file for complete search history.

(56) References Cited

U.S. PATENT DOCUMENTS

| | | | |
|---|---|---|---|
| 4,406,993 A | 9/1983 | Kurtz | |
| 5,973,590 A | 10/1999 | Kurtz et al. | |
| 5,999,082 A | 12/1999 | Kurtz et al. | |
| 6,210,989 B1 | 4/2001 | Kurtz et al. | |
| 6,272,929 B1 | 8/2001 | Kurtz et al. | |
| 6,330,829 B1 | 12/2001 | Kurtz et al. | |
| 6,591,686 B1 | 7/2003 | Kurtz | |
| 6,782,754 B1* | 8/2004 | Broden et al. | 73/753 |
| 7,432,795 B2* | 10/2008 | Kurtz et al. | 338/36 |
| 7,540,196 B2* | 6/2009 | Kurtz et al. | 73/714 |
| 7,762,139 B2* | 7/2010 | Kurtz et al. | 73/714 |
| 2009/0205433 A1* | 8/2009 | Kurtz | 73/721 |
| 2009/0205434 A1* | 8/2009 | Kurtz | 73/721 |
| 2009/0260446 A1* | 10/2009 | Kurtz et al. | 73/721 |

* cited by examiner

*Primary Examiner* — Andre J Allen
(74) *Attorney, Agent, or Firm* — James E. Schutz, Esq.; Troutman Sanders LLP

(57) ABSTRACT

An oil-filled pressure transducer including a glass pre-form having contact pins and a oil-filled tube, each running top to bottom through holes in the pre-form. The oil-filled tube extends beyond the top of the pre-form. A glass alignment plate has an alignment aperture designed to fit over the extended oil-filled tube and-another aperture placed at a pre-determined position from the alignment aperture which is shaped to accommodate a sensor. When the plate is aligned over the oil-filled tube, a sensor module can be positioned accurately in the alignment aperture so that contact is made with the pins. A header having a central diaphragm is placed over the pre-form and the aligned sensor creating a space between the diaphragm and the sensor which is filled with oil. The transducer utilizes less oil and exhibits a lower backpressure with increasing temperature than other oil-filled pressure transducers of similar size.

17 Claims, 6 Drawing Sheets

LEADLESS OIL FILLED PRESSURE TRANSDUCER

FIELD OF INVENTION

The present invention relates generally to an oil filled pressure transducer and a method for making such a transducer and more particularly, to an oil filled pressure transducer having a lower backpressure when temperature is increased.

BACKGROUND OF THE INVENTION

Oil filled pressure transducers are well known. The prior art shows such devices that have been used with oil, where oil or fluid is employed as a force-transmitting medium. In such devices, the pressure is applied to a transducer diaphragm, and typically these devices employ a metal diaphragm as a force collector. Such oil filled transducers are known in the art. For example, see U.S. Pat. No. 4,406,993 entitled, "Oil Filled Pressure Transducers" issued on Sep. 27, 1983 to Anthony D. Kurtz, the inventor herein, and assigned to Kulite Semiconductor Products, Inc., the assignee herein. See also U.S. Pat. No. 6,330,829 entitled, "Oil Filled Pressure Transducer" issued Dec. 18, 2001 to A. D. Kurtz et al., the inventor herein, and assigned to Kulite Semiconductor Products, Inc., the assignee herein.

It is well known that the pressure caused by a deflection (δ) of a clamped edge diaphragm of thickness (t) and radius (a) is given by:

$$P = \frac{16\delta E m^2 + 3}{3a^4(m^2 - 1)}$$

Where m=reciprocal of Poisson's Ration
P=pressure
E=Young Modulus

In an oil-filled pressure transducer, the sensor element is isolated from the pressure media by means of a thin metal diaphragm and the pressure is transmitted to the sensor by means of a volume of oil mainly in the form of a film between the metal diaphragm and the sensor. This is, of course, indicated in the above-noted patents. In any event, when the temperature increases, the oil expands and pushes against the metal diaphragm thus exerting a backpressure against the sensor leading to an error signal. This problem is known and is addressed and explained in U.S. Pat. No. 5,999,082 entitled, "Compensated Oil Filled Pressure Transducer" issued on Dec. 7, 1999 to A. D. Kurtz et al., the inventor herein and assigned to the assignee herein. In that patent, the object was to reduce errors at very low pressure caused by the oil exerting a tension on the deflecting portion of the diaphragm. A first attempt to make a minimum oil volume transducer using a leadless sensor structure was shown in U.S. Pat. No. 6,591,686 entitled, "Oil Filled Pressure Transducer".

The prior art describes an oil filled pressure transducer which utilizes a leadless sensor which is secured to a header comprising a glass pre-form and a header shell. The glass pre-form contains holes which accept header pins and another aperture or hole which accepts the oil fill tube. The diameter of the sensor was chosen to be almost as large as the inner diameter of the shell. In this manner, there was a small cut out over the portion of the sensor that would otherwise cover the oil fill tube. The sensor was mounted to the header using glass bonds. There was a very small space between the outer diameter of the sensor and the inner diameter header housing, which was filled with glass used to mount the sensor. Since there were no ball bonds or gold wires in the area between the surface of the sensor and the diaphragm the distance between the sensor and metal diaphragm was drastically reduced, thereby substantially reducing the backpressure problem. However, there are still a number of remaining problems with this construction. Making the sensor diaphragm chip the same size as the inner hole is not appropriate. It is difficult to line up the location of the header pins with respect to the apertures in the sensing diaphragm. Using this approach, it is very difficult to maintain a close separation between the metal diaphragm and the underlying sensor over a large diameter. It is very difficult to orient the sensing diaphragm with respect to the pins, thus making the mounting exceedingly difficult. It is an object of this invention to reduce the oil volume while enabling easier sensor assembly. It is another object of the present invention to make the effective diameter of the isolation diaphragm much larger to reduce the back pressure.

It is an object of the present invention to reduce the oil volume to a minimum volume expansion and thus reduce the error causing backpressure.

SUMMARY OF INVENTION

An oil filled pressure transducer utilizes a leadless sensor which is secured to a header comprising a glass pre-form and a header shell. The glass pre-form contains holes which accept header pins and another aperture or hole which accepts the oil fill tube. There is now employed an alignment glass which becomes part of the transducer structure. The alignment glass is self locating due to the fact that the oil filled tube is raised above the surface of the header glass. The alignment glass has a diameter essentially equal to the inner diameter of the header shell. It also contains a rectangular cut out which conforms to the size of the sensor die and external from this cut out is a hole through which the oil filled tube may pass. The sensing diaphragm is mounted to the header in the following way: The alignment glass is mounted to the header using a glass bond; the sensor is mounted to the header using glass bonds during the same operation. In this way the rectangular hole in the alignment glass defines where the header pins are relative to the sensing element. In this way it becomes comparatively easy to mount the sensor on top of the header pins to insure a good contact between the header pins and the sensing network on the diaphragm.

Moreover, the diaphragm and the alignment glass can be made significantly larger than the dimensions of the sensor and since the alignment glass is of known uniform thickness it is easier to maintain a very narrow gap between the sensor and the metal diaphragm. This method gives rise to a means of obtaining relatively much smaller oil volumes than in the prior art.

DETAILED DESCRIPTION OF THE FIGURES

Figure 1:
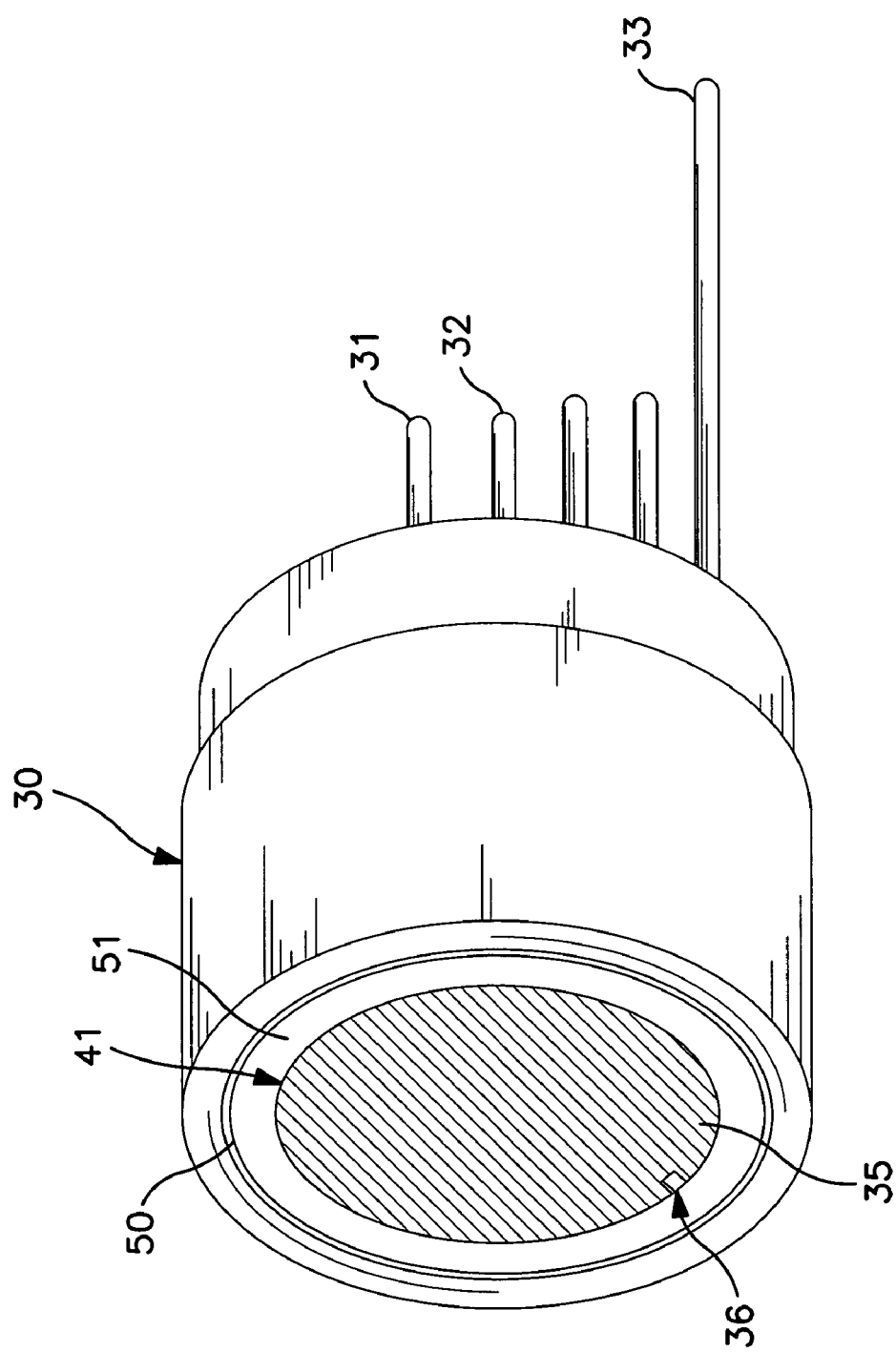
FIG. 1 is a perspective view of a prior art leadless oil filled transducer without a metal diaphragm cover.

Referring to FIG. 1 there is shown a prior art transducer useful in explaining the present invention. The figure shown in FIG. 1 is FIG. 2 of U.S. Pat. No. 6,591,686 entitled "Oil Filled Pressure Transducer" issued on Jul. 15, 2003 to A. D. Kurtz and assigned to Kulite Semiconductor Products, Inc., the assignee herein. That patent, as indicated above, describes an oil filled pressure transducer using a leadless sensor which is secured to a header. In any event, referring to FIG. 1, there is shown the prior art device. As seen in FIG. 1, the transducer includes a header shell 30 which includes pins 31 and 32 and an oil fill tube 33. As will be explained the unit includes a leadless sensor device 41 which is associated with a small oil cavity 36 as compared to multiple oil cavities of prior art devices. It is noted that FIG. 1 of U.S. Pat. No. 6,591,686 as indicated above, shows a prior art device which was prior to the device depicted in the above-noted patent. It is also indicated that the above-noted U.S. Pat. No. 6,691,686 is incorporated herein in its entirety.

Figure 2A:
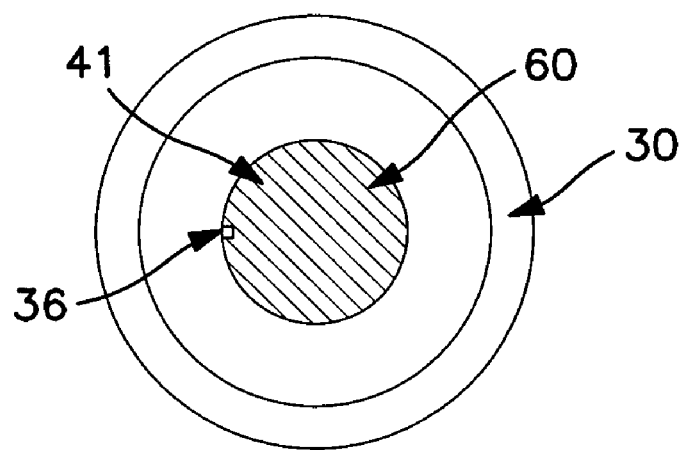
FIG. 2 consists of FIG. 2A and FIG. 2B which show a top plan view and a cross-sectioned view of the prior art transducer 08 FIG. 1.
Figure 2B:
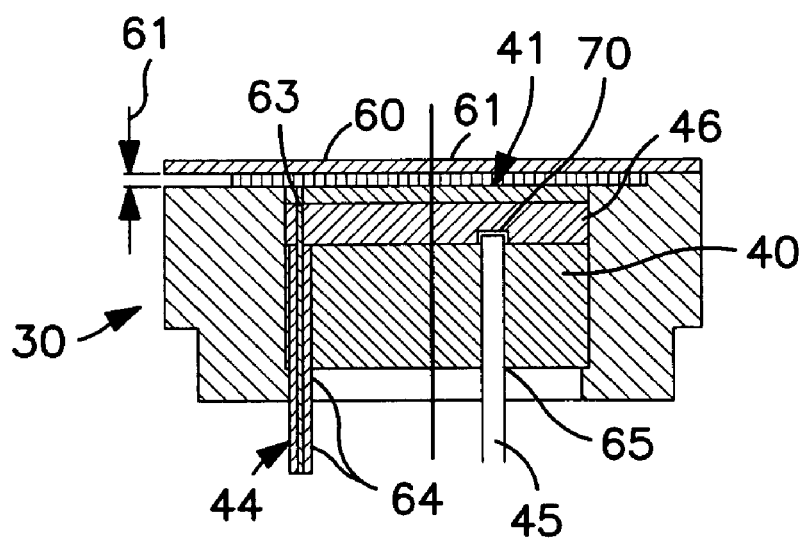

FIG. 2A and FIG. 2B depict the prior art sensor as shown in U.S. Pat. No. 6,691,686 indicated above. Essentially FIGS. 2A and 2B are FIGS. 4A and 4B of U.S. Pat. No. 6,691,681. As seen from FIG. 2A there is shown a top view of the sensor of FIG. 1 and a cross-sectional view FIG. 2B of the sensor. The sensor of the prior art as indicated is a leadless sensor device as can be seen from FIGS. 2A and 2B, the header includes a header shell 30 and a glass pre-form 32. The oil fill tube 44 is directed to an aperture 64 in the glass 42 and communicates with an aperture 63 in the transducer. The glass pre-form 46 has a plurality of holes which accept the header pins as hole 64 for pin 44 and hole 65 for the oil fill tube 45. As seen in FIG. 2B the metal diaphragm 60 is secured to the header and basically covers the top portion of the sensor 41. The region requiring oil is shown by reference numeral 61 and is the region between the metal diaphragm 60 and the top portion of the sensor 41. As indicated in U.S. Pat. No. 6,591,686, which is incorporated herein in its entirety, it is shown that the distance between the sensor 41 and the metal diaphragm is reduced thus exhibiting a marked improvement in performance and assembly over prior art devices as those prior to that device depicted in U.S. Pat. No. 6,591,686. In any event, as indicated above, it is an object of the present invention to still improve the design.

Figure 3:
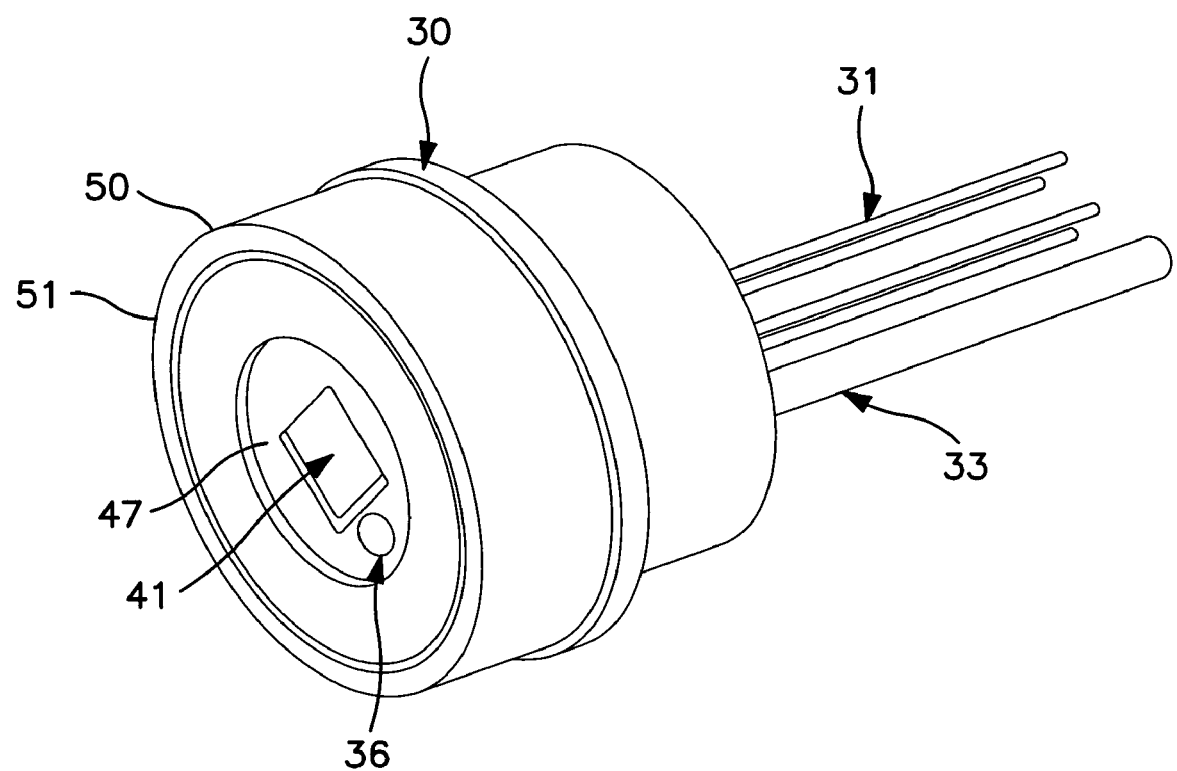
FIG. 3 is a perspective view of an improved leadless oil filled transducer according to this invention.

Referring to FIG. 3 there is shown on oil filled pressure transducer according to this invention. It is noted that in FIG. 3 the same reference numerals have been utilized to depict the same parts as shown in the prior art FIGS. 1 and 2. Essentially, the transducer of FIG. 3 includes a header shell 30 which includes pins 31 and an oil fill tube 33. As will be explained, this unit includes a leadless sensor device 41, an alignment glass 47 which is associated with a small oil cavity 36, and to align the sensor 41 for ease of mounting, as compared to the prior art device. As can be seen, there is a similarity between the general appearance of the prior art device of FIGS. 1 and 2 and that device of FIG. 3. The header 30 also has a peripheral flange 50 about the top opening 51. The opening is covered by a metal diaphragm 60 (FIG. 4B). The peripheral flange is of a given height which height partly determines the oil volume.

Figure 4A:
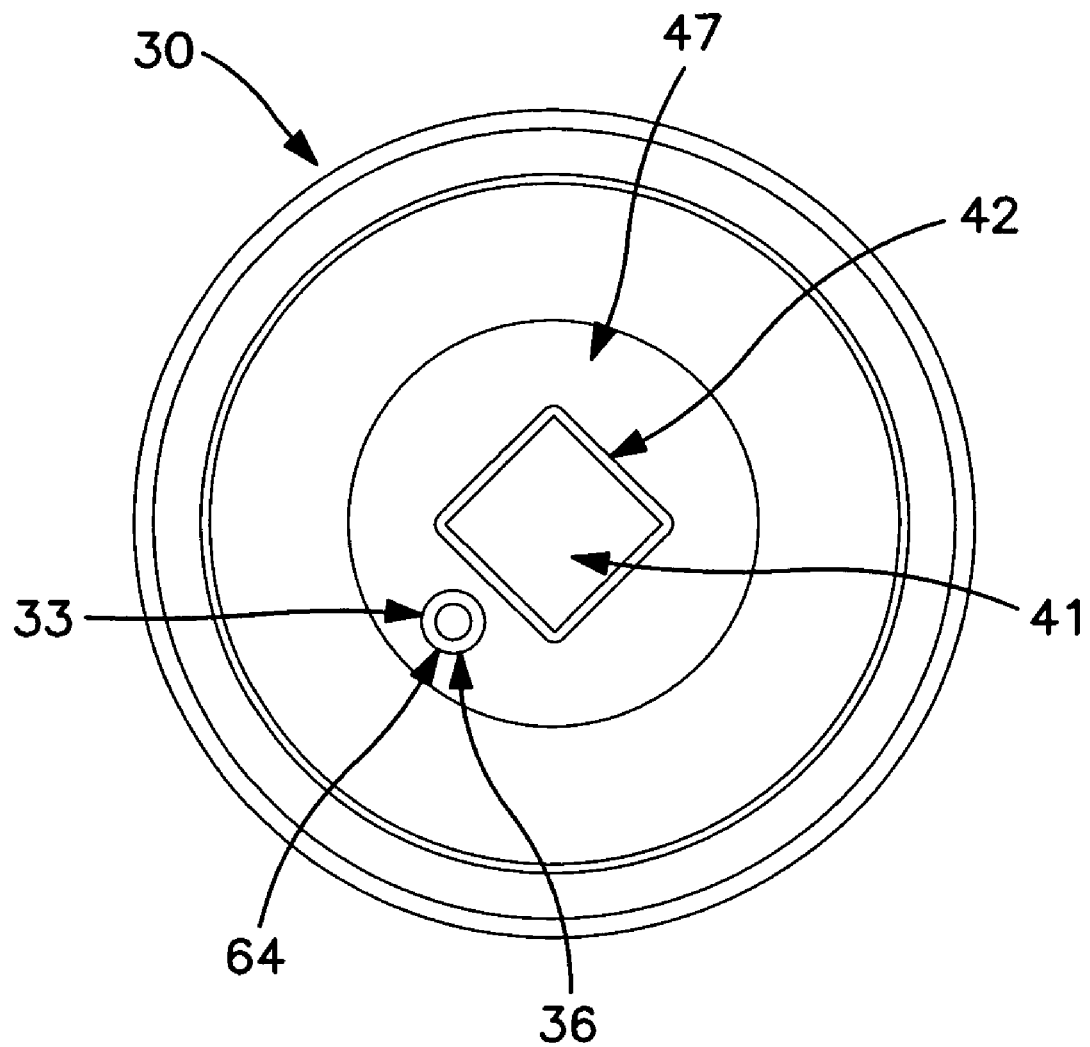
FIG. 4 consists of a top view FIG. 4A of the prior art transducer and a cross sectional view FIG. 4B of the prior art transducer as shown in FIG. 1.
Figure 4B:
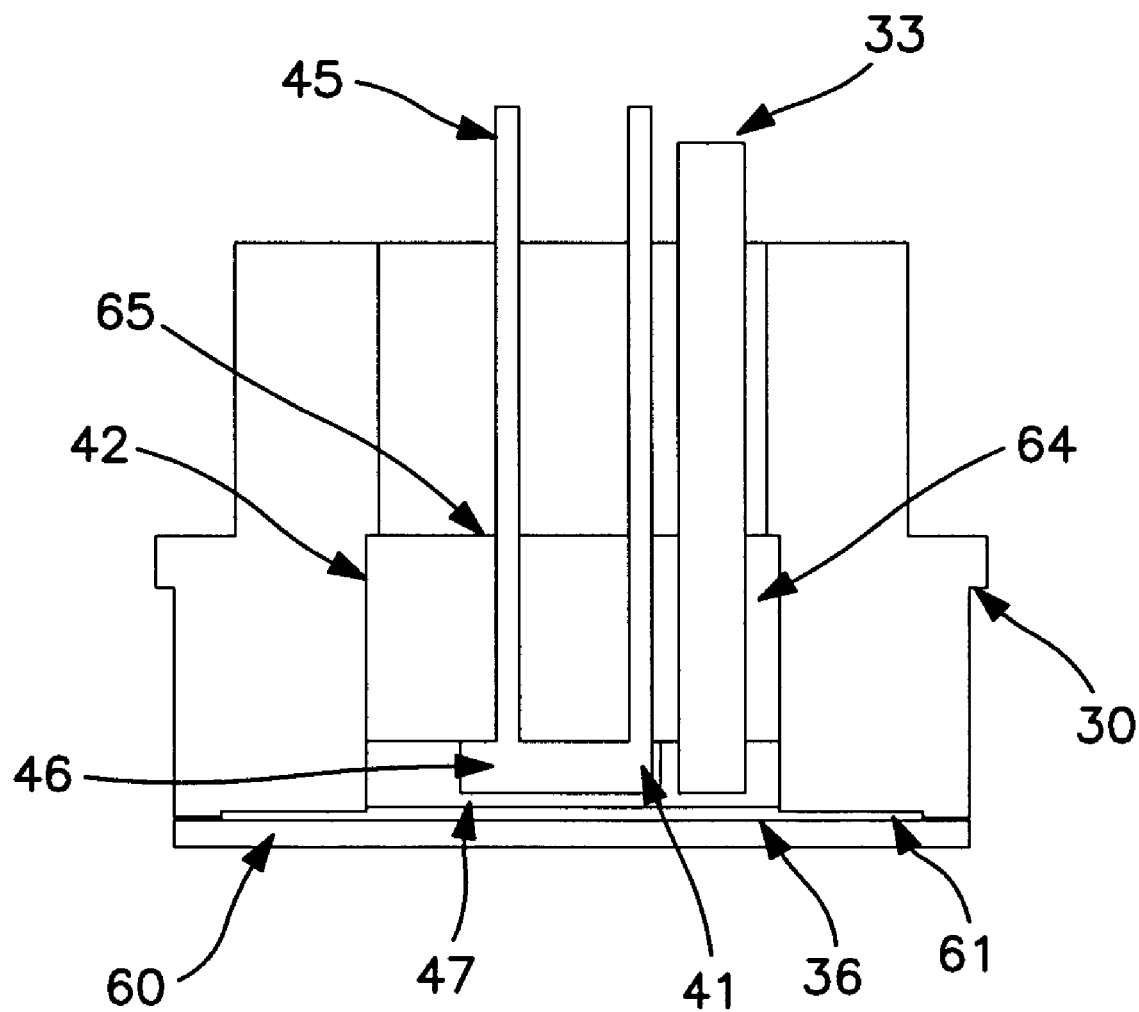

Referring to FIG. 4A, there is shown a top view of the sensor of FIG. 3 and a cross sectional view (FIG. 4B) of the sensor of FIG. 3. The sensor of this invention is a leadless sensor device 41. Leadless sensors have been developed by Kulite Semiconductor Products, Inc., the assignee herein. For examples of such sensor devices, reference is made to U.S. Pat. No. 6,272,929 entitled, "High Pressure Piezoresistor Transducer Suitable for Use in Hostile Environments" issued on Aug. 14, 2001 to Anthony D. Kurtz et al. See also U.S. Pat. No. 6,210,989 entitled, "Ultra Thin Surface Mount Wafer Sensor Structure and Methods for Fabricating the Same" issued on Apr. 3, 2001 to A. D. Kurtz et al. and assigned to Kulite Semiconductor Products, Inc., the assignee herein. See also U.S. Pat. No. 5,973,590 entitled, "Ultra Thin Surface Mount Wafer Sensor Structure and Methods of Fabricating the Same" issued on Oct. 26, 1999 to A. D. Kurtz et al.

Basically, these patents show leadless semiconductor sensor devices which include a semiconductor diaphragm having a top surface coating of an oxide layer. There are P+ sensor elements fusion bonded to the oxide layer at a relatively central area of the diaphragm. The P+ finger elements are fusion bonded to the oxide layer and extend from the sensors to an outer contact location of the diaphragm for each of the fingers. There is an external layer with P+material fusion bonded to the oxide layer and surrounding the sensors and fingers. A glass wafer is electrostatically bonded at the bottom surface to the fingers and rim to hermetically seal the sensors and fingers of the diaphragm member. The glass wafer includes a depression above the sensors and has a plurality of apertures where each aperture is associated a separate finger at the contact location, and each aperture is smaller than the associated finger lining up with the contact location. Each contact location can be accessed via the associated aperture. The sensors contain piezoresistive P and elements normally arranged in a Wheatstone bridge configuration.

The sensor basically is a leadless device in the sense that the header pins of the diaphragm are coplanar with the top surface of the glass wafer and hence these transducers are extremely thin and do not have the conventional wire leads. The sensors described in the above-noted patents do not have wires bonded to pins, but utilize the P+ finger elements which are fusion bonded to outer contact locations as shown in the above patents, all of which are incorporated herein by reference.

The header includes a header shell 30 and a glass pre-form 42. The oil fill tube 33 is directed through an aperture 64 in the glass 42. The glass pre-form 42 contains five holes. Four of the holes accept the header pins as hole 65 for pin 45, while the other hole 64 accepts the oil fill tube 33. The arrangement is like the prior art U.S. Pat. No. 6,591,686 device. The pins 45 are about 0.01 inches in diameter and protrude about 0.005 inches from the top surface of the glass pre-form 42. The pin 45 is shown extending into the contact terminal present in the leadless transducer 41. In addition, the oil filled tube 44 is located near the outside diameter of the glass and is about 0.03 inches in diameter. The pins 45 and the oil fill tube 44 are hermetically sealed to the glass pre-form during firing, as well as the header shell. The entire structure as shown in FIG. 4 is subjected to heat which causes the glass associated with the sensor 41 to be secured to the glass pre-form 42 by means of heat and using a frit, which essentially causes a hermetic seal to form. This seal secures the glass pre-form 42 to the glass layer 46 of the leadless sensor 41. The firing also secures the header glass 42 as well as the glass section 46 of the sensor to the header shell 30. The alignment glass 47 is selected to be almost as large as the inner diameter of the metal shell 30. The firing also secures the alignment glass 47 to the glass pre-form 42. There is a small cut out 36 which is shown in the top view and also indicated in FIG. 2. The small cut out 36 is positioned over a portion of the alignment glass that would otherwise cover the oil fill tube 44.

The sensor 41 is mounted to the header 30 using a metal glass frit (conductive) to bond the pins to the sensor contacts and a ceramic glass frit to join the rest of the sensor surface to the glass header. This enables the unit to then be fired using the glass frit and the ceramic glass frit to secure the parts together. Any space between the outer diameter of the alignment glass 47 and the inner diameter of the header housing 30 is filled by the glass frit, which is used to mount the sensor and the alignment glass. This occurs when the unit is fired and the glass flows and fills the voids. It can easily be seen that the only region requiring oil is the region between the non-contact surface of the sensor, alignment glass and the metal diaphragm 60.

Figure 5:
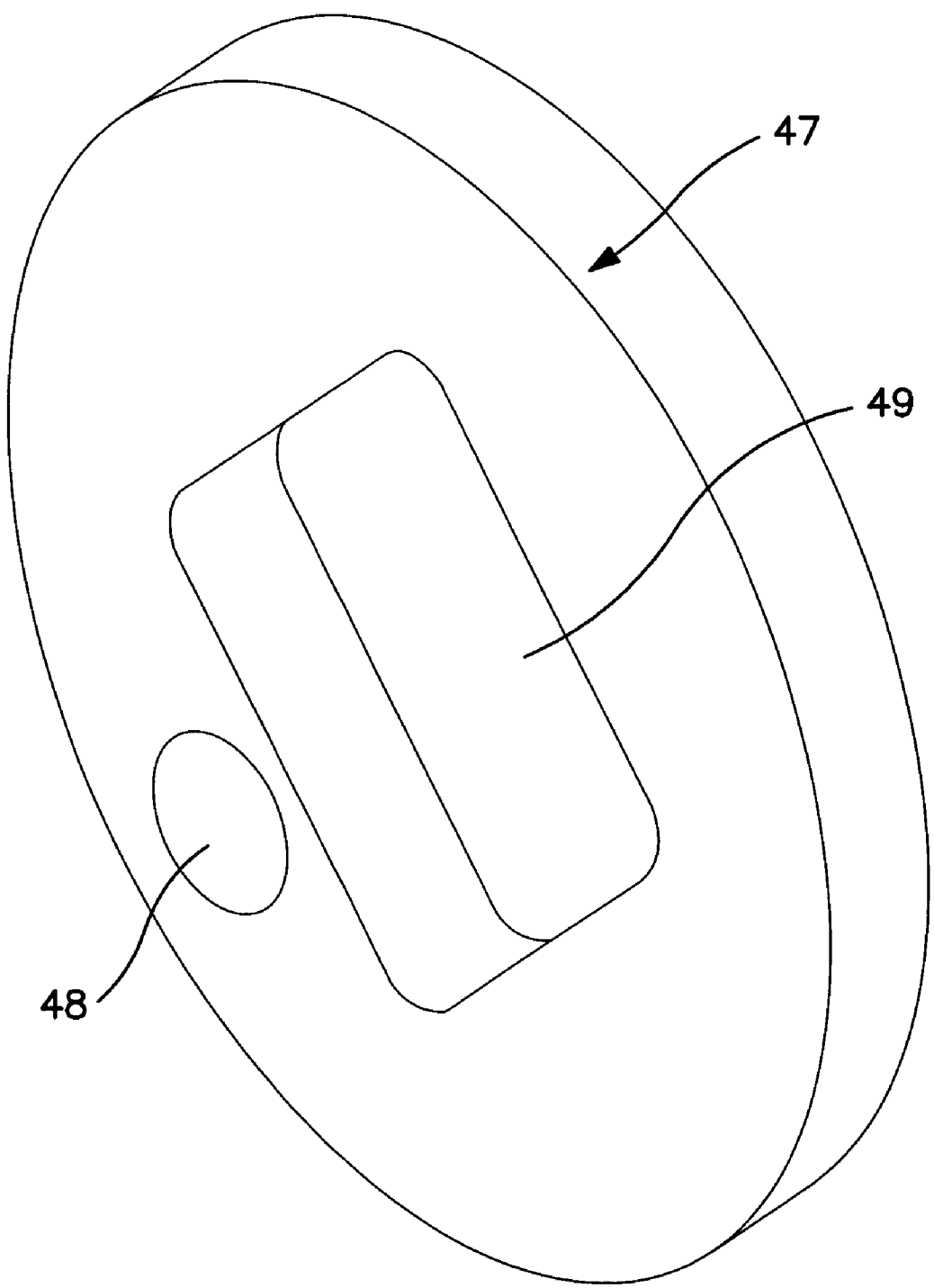
FIG. 5 is a perspective view of a glass alignment structure according to this invention.

As seen in FIG. 4, the metal diaphragm 60 is secured to the header and basically covers the top of the sensor 41. The region requiring oil is shown by reference numeral 61 and is the region between the metal diaphragm 60 and the top portion of the sensor 41 and the alignment glass 47. Since there are no gold bonds or gold wires in the area between the surface and the sensor of the metal diaphragm, this region 61 is the only region requiring oil. Thus, the distance between the sensor 41 and the alignment glass 47 and the metal diaphragm is drastically reduced, leaving a gap, for example, of between 0.001 inch to 0.002 inch. This small gap and the ability to reduce almost to zero, the space between the outer diameter of the sensor 41 and the alignment glass 47 (FIG. 5) and the inner diameter of the header housing serves to reduce oil volume by at least an order of magnitude. As seen in FIG. 4A there is an alignment glass 47. The alignment glass 47, as seen in FIG. 5, basically is a glass member which has an alignment aperture 48 and a chip accommodating aperture 49. When the unit is fabricated the oil fill tube 33 expends above the top surface of the glass member 42. In this manner, the alignment glass is placed so that the aperture 48 encircles the oil fill tube 33, as shown in FIG. 4B. In this manner, the sensor accommodating aperture 49 is precisely positioned with respect to the pins as 45. Thus, one now places the sensor chip 41 in the pin area surrounded by the walls of aperture 49. This assures that the sensor chip 41 is properly aligned. It further assures that the spacing between the diaphragm and the top portion of the sensor is minimized because of the precise alignment. This reduces the gap and can reduce it to almost zero, because of the method of aligning. As one can see, the top surface of the alignment glass member 47 protrudes into the oil fill area thus further reducing the amount of oil, while the aperture 49 allows oil to be directly coupled to the deflecting diaphragm associated with the sensor 41. Thus the use of the alignment plate substantially reduces the amount of oil required to fill the region 61. Essentially, one can readily compute the expected deflection of the metal diaphragm for the two different structures and thus, the backpressure, (new FIGS. 3 and 4) and prior art (FIGS. 1 and 2).

The deflection ($\delta$) for an increase $\Delta P$ is given by the equation $\delta = h \times (dB/dT) \times \Delta T$. Where (h) is the height of the oil gap, $\Delta T$ is the temperature increase, (B) is the bulk compressibility of the oil and dB/dT is the coefficient of thermal expansion of the oil. For silicon oil $dB/dT = 100 \times 10^{-5}/K°$.

Thus, for a difference of temperature of 100° K, $\delta = 0.1$ h, when h=0.001 inch, $\delta = 0.0001$ inch. However, when h=0.015 inches, $\delta = 0.0015$ inches, which is 15 times larger. Since the backpressure is directly proportional to $\delta$, the wider gap oil filled unit exhibits a backpressure 15 times larger, thus leading to a substantial error signal. It is therefore apparent that the apparatus shown, for example in FIGS. 2 and 4 are extremely desirable and exhibits a marked improvement in performance over prior art devices.

From the two oil heights assuming the following:
t=0.001 inches
E=30×10$^6$ lb/in$^2$
M=3.3
The actual backpressures with given radius are:

| Radius | Wide Gap .015 Oil Height | Narrow Gap .001 Oil Height |
|---|---|---|
| .10" | 2.64 PSI | .18 PSI |
| .20" | .165 PSI | .011 PSI |

Where $P_1$ is the backpressure for the wide gap case, which is the prior art device shown, for example, in FIG. 1 and in FIG. 2 and $P_2$ is the backpressure for the narrow gap case, which is the improved oil filled transducer shown in FIG. 3 and FIG. 4.

What is claimed is:

1. An oil-filled pressure transducer, comprising:
a glass pre-form having a plurality of pin accommodating apertures and having an oil tube accommodating aperture, said glass pre-form having a top and bottom surface, with said apertures extending between said surfaces,
a plurality of contact pins each inserted into and associated with one of said pin accommodating apertures and extending from said top to said bottom surface of said pre-form,
an oil fill tube inserted in to said oil tube accommodating aperture and extending from said bottom to said top surface of said pre-form with one end of said tube extending above said top surface of said pre-form,
a glass alignment plate having an alignment aperture for encircling said extended oil fill tube at said top pre-form surface and having a sensor accommodating shaped aperture located at a predetermined position from said alignment aperture,
a sensor module inserted in said shaped aperture and having contacts which are aligned with said pins to contact said pins when said sensor is positioned in said shaped aperture,
a header having a central aperture surrounded at a top surface by a peripheral flange with said sensor as positioned on said pre-form, secured in said header aperture,
a diaphragm covering said top surface of said header to create a space between the top surface of said sensor and the bottom surface of said diaphragm which space is determined by the height of said flange and the thickness of said alignment glass secured to said pre-form to provide an oil accommodating area for containing a volume of oil to substantially reduce back pressure as compared to a conventional transducer of the same size.

2. The pressure transducer according to claim 1 wherein said height of said flange is about 0.001 inches.

3. The pressure transducer according to claim 1 wherein said pins are sealed to said glass pre-form by a hermetic seal.

4. The pressure transducer according to claim 1 wherein said sensor is secured to said glass pre-form by a glass frit bond.

5. The pressure transducer according to claim 1 wherein said sensor and said glass pre-form is secured to said header by a glass bond.

6. The pressure transducer according to claim 1 wherein said alignment glass is secured to said header by a glass bond.

7. The pressure transducer according to claim 1 wherein said backpressure is reduced by a factor of at least 10 times as compared to a conventional transducer of the same size.

8. The pressure transducer according to claim 1 wherein said conductive pins are about 0.010 inches in diameter.

9. The pressure transducer according to claim 1 wherein said height of said peripheral flange is between 0.001 to 0.002 inches.

10. The pressure transducer according to claim 1 wherein the volume of oil contained is an order of magnitude less than required for a conventional sensor of the same size.

11. The pressure transducer according to claim 1 wherein said semiconductor portion of said sensor is fabricated from silicon.

12. The pressure transducer according to claim 1 wherein said sensor module is a piezoresistive sensor module.

13. The pressure transducer according to claim 1 wherein said diaphragm is a metal diaphragm.

14. The pressure transducer according to claim 12 wherein said sensor module is a leadless sensor.

15. The pressure transducer according to claim 12 wherein said piezoresistive sensors are P+ silicon sensors.

16. The pressure transducers according to claim 15 wherein said P+ sensors are fusion bounded to an oxide layer on a semiconductor diaphragm.

17. The pressure transducer according to claim 15 wherein said sensors are arranged in a Wheatstone bridge configuration.

* * * * *